(12) United States Patent
Miyazaki (10) Patent No.: US 11,140,333 B2
(45) Date of Patent: Oct. 5, 2021

(54) IMAGE PICKUP APPARATUS CAPABLE OF CONTROLLING FLASH EXPOSURE AND CONTROL METHOD THEREFOR

(71) Applicant: CANON KABUSHIKI KAISHA, Tokyo (JP)

(72) Inventor: Yasuyoshi Miyazaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/412,508

(22) Filed: May 15, 2019

(65) Prior Publication Data

US 2019/0364189 A1 Nov. 28, 2019

(30) Foreign Application Priority Data

May 22, 2018 (JP) .............................. JP2018-098053

(51) Int. Cl.
*H04N 5/235* (2006.01)
*H04N 5/232* (2006.01)
*H04N 5/3745* (2011.01)

(52) U.S. Cl.
CPC ......... *H04N 5/2354* (2013.01); *H04N 5/2353* (2013.01); *H04N 5/23229* (2013.01); *H04N 5/37455* (2013.01)

(58) Field of Classification Search
CPC ............... H04N 5/2354; H04N 5/2353; H04N 5/37455; H04N 5/23229; H04N 5/232125; H04N 5/2352
See application file for complete search history.

(56) References Cited

U.S. PATENT DOCUMENTS

| 2007/0036531 A1* | 2/2007 | Tokunaga ............... G03B 17/20 396/69 |
| 2009/0028537 A1* | 1/2009 | Tamura ............... H04N 5/23258 396/55 |
| 2012/0155846 A1* | 6/2012 | Gilbert-Schachter ....................... G03B 15/05 396/106 |
| 2013/0293745 A1* | 11/2013 | Tamura ................ H04N 5/2354 348/234 |

(Continued)

FOREIGN PATENT DOCUMENTS

JP  H10319471 A  12/1998

*Primary Examiner* — Jason A Flohre
(74) *Attorney, Agent, or Firm* — Rossi, Kimms & McDowell LLP (57) ABSTRACT

An image pickup apparatus that improves flash-exposure accuracy by adjusting a light amount suitably depending on a situation so that variation decision of the object distance based on a distance map will be possible. An image sensor outputs an image signal. A memory device stores a set of instructions. At least one processor executes the set of instructions to calculate a main emission amount using luminance of a pre-emission image corresponding to the image signal, divide a picked-up image frame corresponding to the image signal into a plurality of blocks, obtain distance information for each of the blocks, adjust luminance of the image signal for each of the blocks, and determine whether distance continuously varies in a same direction between adjacent blocks within a region corresponding to a same object based on the distance information obtained using the image signal of which luminance is adjusted.

13 Claims, 10 Drawing Sheets

(56) References Cited

U.S. PATENT DOCUMENTS

| | | | |
|---|---|---|---|
| 2014/0178059 A1* | 6/2014 | Miyazaki | H04N 5/2354 396/166 |
| 2015/0227023 A1* | 8/2015 | Hamano | H04N 5/144 348/169 |
| 2015/0237243 A1* | 8/2015 | Suzuki | H04N 5/2354 348/140 |
| 2016/0219206 A1* | 7/2016 | Miyazaki | H04N 5/2351 |
| 2016/0295136 A1* | 10/2016 | Kageyama | H04N 5/2353 |
| 2018/0247148 A1* | 8/2018 | Saitou | H04N 5/23229 |

\* cited by examiner

Reliability of distance map is high because background is bright.

Create distance map as-is.

FIG. 4B

Reliability of distance map is low because background is dark.

(1) Obtain object distance and background distance within irradiation range of AF assist light.

Since AF-assist-light emitter is designed so that center of image frame will be irradiated with AF assist light in general, AF assist light may not reach periphery that is problem of flash.

Background around object becomes bright, which improves reliability of distance map.

(2) Pre-emission
Object distance is obtained within irradiation range of AF assist light. Increase pre-emission amount within flash-exposure controllable range.

(3) Reliability of distance map is improved by increasing background luminance.

(4) Pre-emission
Increasing amount of exposure is limited so that object will not be saturated with pre-emission.

NON-EMISSION IMAGE

FIG. 6B

PRE-EMISSION IMAGE

FIG. 6C

REFLECTION LUMINANCE WEIGHT

DISTANCE MAP

FIG. 7C

HORIZONTAL WEIGHT

FIG. 7D

VERTICAL WEIGHT

FIG. 7E

DISTANCE WEIGHT

FIG. 7F

WEIGHT CORRESPONDING TO DISTANCE DIFFERENCE

FIG. 8A

REFLECTION LUMINANCE WEIGHT

FIG. 8B

DISTANCE WEIGHT

FIG. 8C

FLASH-EXPOSURE CONTROL WEIGHT

FIG. 9A

NON-EMISSION

FIG. 9B

PRE-EMISSION

GROUND SURFACE AREA EXTRACTION

FIG. 9C

MAIN EMISSION

Since ground surface is extracted as reflection area by pre-emission, object is over exposure.

IMAGE PICKUP APPARATUS CAPABLE OF CONTROLLING FLASH EXPOSURE AND CONTROL METHOD THEREFOR

BACKGROUND OF THE INVENTION

Field of the Invention

The present invention relates to an image pickup apparatus, such as a digital camera and a digital video camera, and a control method therefor, and in particular, relates to a flash-exposure control technique at a time of flash emission photographing.

Description of the Related Art

An image pickup apparatus, such as a digital camera, may employ a pre-emission system that performs pre-emission before main emission as flash-exposure control at a time of flash photographing. The pre-emission system performs main emission using a proper main emission amount calculated on the basis of data that is obtained by measuring reflected light from difference between a non-emission image that is taken first and a pre-emission image that is taken later.

Specifically, presence of an object in each of blocks is checked from luminance difference between a non-emission image and a pre-emission image. Then, a weight of each block is set on the basis of a result of checking, and the main emission amount that makes an object be proper exposure is calculated by taking external light into consideration (see Japanese Laid-Open Patent Publication (Kokai) No. H10-319471 (JP H10-319471A), for example). This photographing system is able to find the proper main emission amount even if an object is positioned in any position in an image frame as long as the object is positioned within the distance that the pre-emission light is reachable.

Figure 9A:
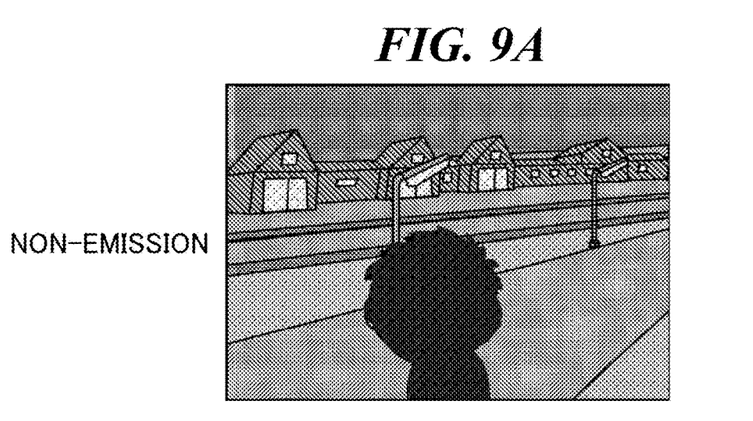
FIG. 9A through FIG. 9C are views describing a harmful effect of background information on the flash-exposure control.
Figure 9B:
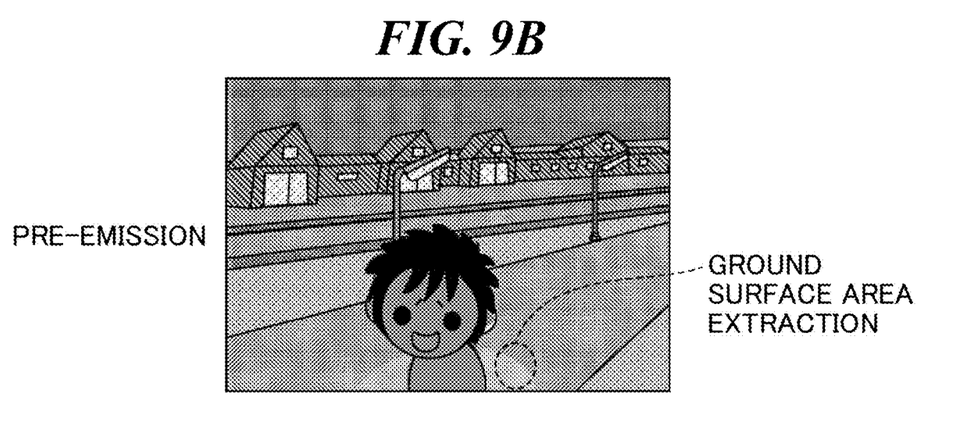
Figure 9C:
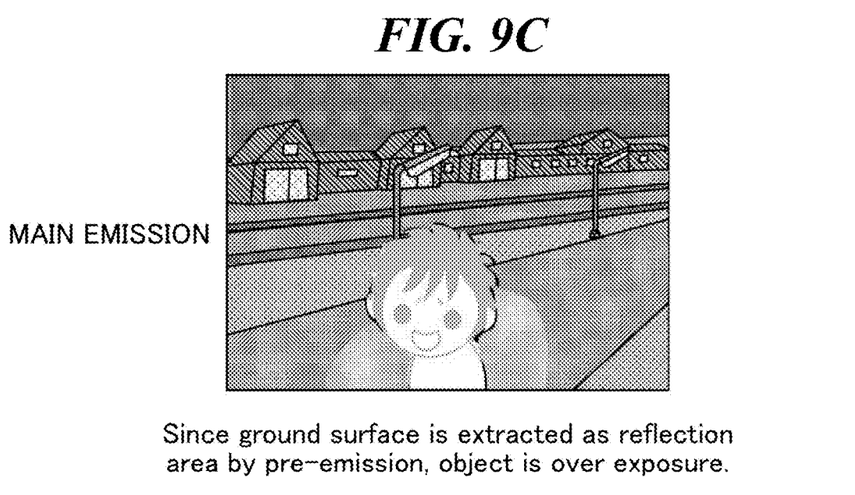

However, when the above-mentioned flash-exposure control is performed in a scene where a ground surface is included in a field angle, the ground surface area, which is not a main object, may be also extracted as an object. In such a case, a proper emission amount cannot be obtained as a result, which misses proper luminance of the main object (see FIG. 9A through FIG. 9C).

Consequently, there is a proposed method that generates a distance map consisting of distance information in an image frame, decides that a region in which the distance varies step by step is a background region, and performs the flash-exposure control. In the proposed method, image-pickup-plane phase difference pixels for distance measurement are inserted in an image pickup device, and the distance map is obtained by obtaining a focus detection result for every pixel at the same time that a video signal is obtained, for example.

Figure 10:
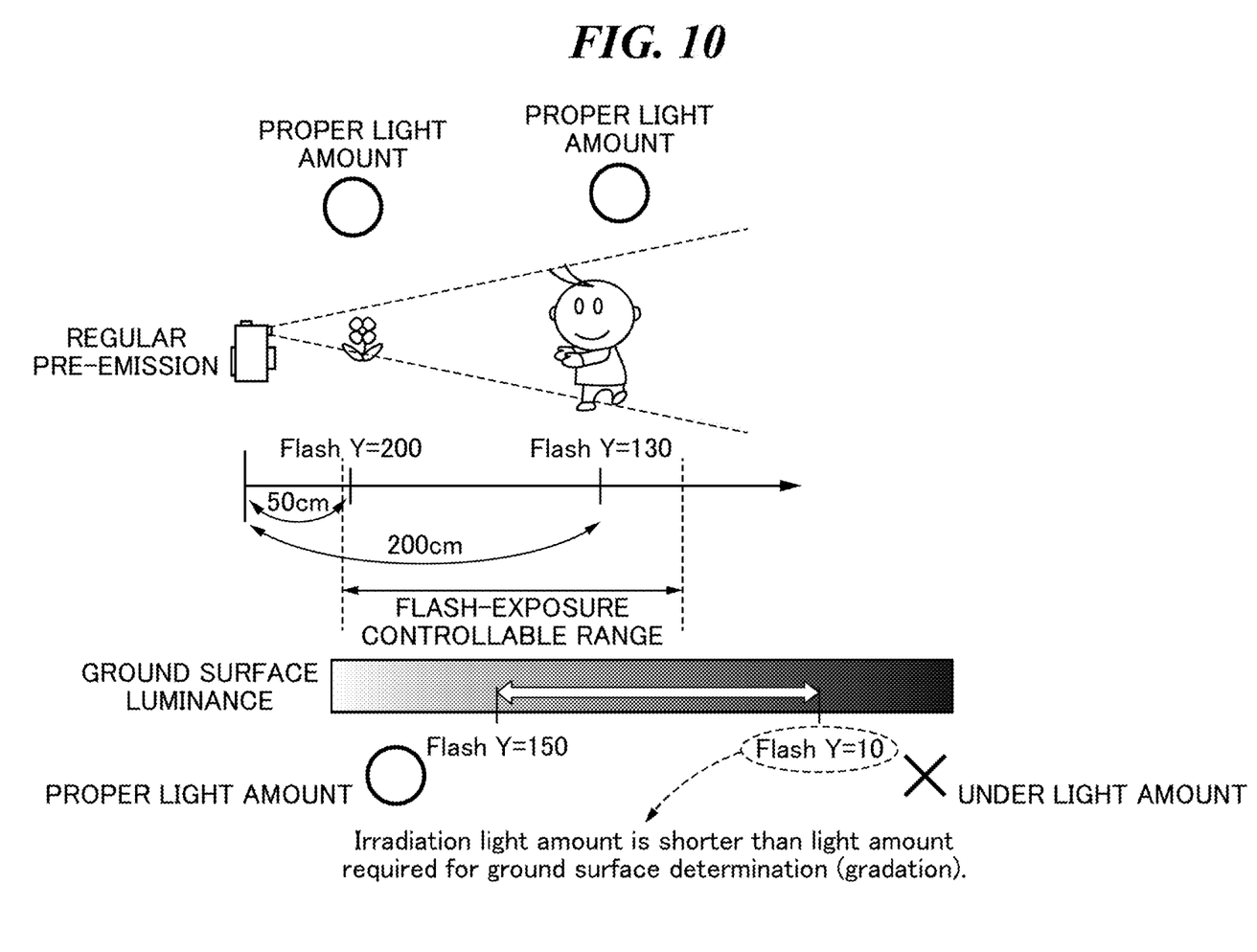
FIG. 10 is a view describing a harmful effect of shortage of a pre-emission amount.

However, the above-mentioned method needs a luminance level (for example, Y=50) that enables to detect distance in a target area in order to generate the distance map. When flash photographing is performed, effective distance information may not be taken because surrounding external light environment is dark in general. Although the distance information may be taken from the pre-emission image in the flash-exposure control by the pre-emission system, the normal pre-emission aims to irradiate an object. Accordingly, there is a problem that the distance map in effective accuracy cannot be generated because the irradiation amount for the ground surface, which is a target that should be cut and divided using the distance difference, tends to be insufficient (see FIG. 10).

SUMMARY OF THE INVENTION

The present invention provides a flash-exposure control technique at a time of flash emission that improves flash-exposure accuracy by adjusting a light amount suitably depending on a situation so that variation decision of the object distance based on the distance map will be possible.

Accordingly, a first aspect of the present invention provides an image pickup apparatus including an image sensor that outputs an image signal, a memory device that stores a set of instructions, and at least one processor that executes the set of instructions to calculate a main emission amount using luminance of a pre-emission image corresponding to the image signal, divide a picked-up image frame corresponding to the image signal into a plurality of blocks, obtain distance information for each of the blocks, adjust luminance of the image signal for each of the blocks, and determine whether distance continuously varies in a same direction between adjacent blocks within a region corresponding to a same object based on the distance information obtained using the image signal of which luminance is adjusted.

Accordingly, a second aspect of the present invention provides a control method for an image pickup apparatus including an image sensor that outputs an image signal, a memory device that stores a set of instructions, and at least one processor that executes the set of instructions, the control method including calculating a main emission amount using luminance of a pre-emission image corresponding to the image signal, dividing a picked-up image frame corresponding to the image signal into a plurality of blocks, obtaining distance information for each of the blocks, adjusting luminance of the image signal for each of the blocks, and determining whether distance continuously varies in a same direction between adjacent blocks within a region corresponding to a same object based on the distance information obtained using the image signal of which luminance is adjusted.

According to the present invention, an object and a background are able to be divided suitably even in a case of photographing in a dark place that needs flash emission, which produces a good emission image.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Figure 1:
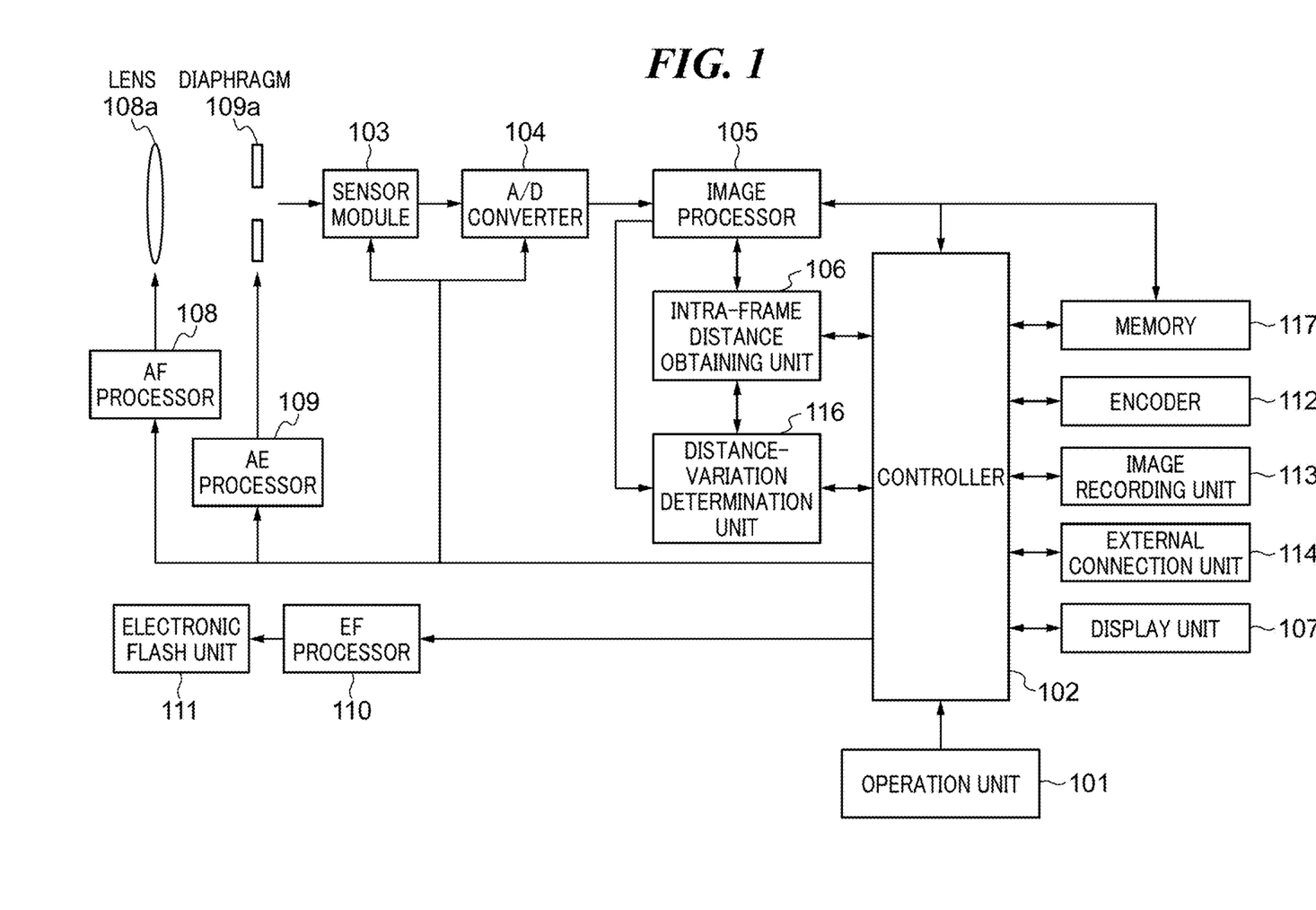
FIG. 1 is a block diagram schematically showing a configuration example of a digital camera as an example of an image pickup apparatus according to an embodiment of the present invention.

FIG. 1 is a block diagram schematically showing a configuration of a digital camera (hereinafter referred to as a camera) as an example of an image pickup apparatus according to an embodiment of the present invention.

In FIG. 1, an operation unit 101 is constituted by switches, buttons, etc. that are operated when an operator enters various kinds of instructions to the camera. The operation unit 101 also includes a shutter switch and a touch sensor of a display unit 107. A controller 102 has a CPU, ROM, RAM, etc. and controls an action of the entire camera. Moreover, the controller 102 controls each part according to an instruction from the operation unit 101.

A sensor module 103 receives object light that enters through a lens 108a and diaphragm 109a, and outputs an electric charge corresponding to a light amount. An A/D converter 104 applies sampling, gain adjustment, A/D conversion, etc. to an analog image signal output from the sensor module 103, and outputs a digital image signal.

An image processing unit 105 applies various kinds of image processes to the digital image signal output from the A/D converter 104, and outputs a processed digital image signal. For example, the image processing unit 105 converts the digital image signal received from the A/D convertor 104 into a YUV image signal, and outputs it.

An intra-frame distance obtaining unit 106 obtains the distance information in an image frame on the basis of the image obtained by the image processing unit 105, and generates a distance map. A distance-variation determination unit 116 calculates a distance weight corresponding to a configuration of the distance variation in the image frame on the basis of the obtained distance map.

The display unit 107 consists of a liquid crystal display etc. An AF processor 108 controls the lens 108a on the basis of the image obtained by the image processing unit 105 to adjust focus. An AE processor 109 calculates difference between the luminance of the image generated by the image processing unit 105 and the proper luminance, and controls the diaphragm 109a. An AF-auxiliary-light emitting unit emits AF auxiliary light when environment light is darker than a predetermined value.

An EF processor 110 makes a flash unit 111 emit with a light amount that obtains the proper luminance of the object when the emission is decided. In this embodiment, an object weight is generated from the emission image obtained by the pre-emission photographing and the non-emission image. When the object weight is generated, each of the non-emission image and pre-emission image is divided into a predetermined number of blocks, the luminance values of pixels are integrated for every block, and an object region in which the main object is included is found by taking difference between the integration value of a block of the non-emission image and the integration value of the corresponding block of the pre-emission image. A main object weight used by flash-exposure control calculation is generated by extracting a value in the object region found from among default weights distributed by a centrally weighted manner. Since the generation of the main object weight is well-known, a detailed description is omitted.

An encoder 112 converts the format of the output digital image signal (image data) into the format of JPEG etc., and outputs it to an image recording unit 113. The image recording unit 113 performs a process that records the image data of which the format has been converted received from the encoder 112 into a memory (not shown) built in the camera or an external memory inserted into the camera. An external connection unit 114 acts as a connection unit when the taken image is output to a television apparatus etc. as a video image.

Next, actions in a case of photographing using the camera will be described. First, when a power switch included in the operation unit 101 is turned ON, the controller 102 detects this and supplies electrical power to each part constituting the camera. When the electric power is supplied, the shutter opens and object light enters into the sensor module 103 through the lens 108a and diaphragm 109a. Accordingly, an electric charge accumulated in the sensor module 103 is read and is output to the A/D converter 104 as an analog image signal.

The A/D converter 104 applies sampling, gain adjustment, A/D conversion, etc. to the analog image signal output from the sensor module 103, and outputs it as a digital image signal. The image processing unit 105 applies various image processes to the digital image signal output from the A/D converter 104, and outputs a processed digital image signal.

When receiving a notice (hereinafter referred to as "SW1 ON") of a signal by half press of the photographing button from the shutter switch, the controller 102 performs an AF process and an AE process using the image signal at this time to obtain optimal focus for photographing and an exposure setting condition. Moreover, the controller 102 determines emission or non-emission of the electronic flash at the time of "SW1 ON".

When the controller 102 determines the non-emission and receives a notice (hereinafter referred to as "SW2 ON") of a signal by full press of the photographing button from the shutter switch, the controller 102 shifts to the main photographing and gives the photographing condition set at the time of "SW1 ON" to the AE processing unit 109 and AF processing unit 108. Then, the controller 102 reads an electric charge caused by the light that enters into the sensor module 103 through the lens 108a and diaphragm 109a, and outputs it to the A/D converter 104 as an analog image signal. The image processing unit 105 applies various kinds of image processes to a digital image signal and outputs a processed digital image signal.

Moreover, when determining the emission, the controller 102 shifts to the main photographing at the time of "SW2 ON", gives the photographing condition set at the time of "SW1 ON" to the AE processing unit 109 and AF processing unit 108, and obtains a non-emission image for the flash-exposure control that is taken without emitting the electronic flash first. Next, the controller 102 gives a pre-emission instruction from the EF processing unit 110 to the flash unit 111 to obtain a pre-emission image for the flash-exposure control, and calculates a reflection luminance weight required to make an object into proper luminance at the time of the main photographing using the luminance difference between the non-emission image and the pre-emission image that are used for the flash-exposure control.

Moreover, the controller 102 generates a distance map using the pre-emission image with the intra-frame distance obtaining unit 106, calculates the distance weight on the basis of the variation amount of the distance information about adjacent blocks in the distance map, and calculates the flash-exposure control weight using the obtained distance weight and the reflection luminance weight.

Next, the calculation of the flash-exposure control weight using the distance map will be described. The controller 102 calculates the main emission amount using the flash-exposure control weight mentioned above and performs the main emission and the main exposure after the EF processing unit 110 issues the main emission instruction. Then, the controller 102 reads the electric charge corresponding to the reflected light of the main emission that enters into the sensor module 103 through the lens 108 and diaphragm 109a, and outputs it to the A/D converter 104 as the analog image signal.

The A/D converter 104 applies sampling, gain adjustment, A/D conversion, etc. to the analog image signal output from the sensor module 103, and outputs it as the digital image signal. The encoder 112 converts the format of the digital image signal output from the image processing unit 105 into the format of PEG etc., and outputs it to the image recording unit 113. The image recording unit 113 records the format-converted image data into a predetermined memory.

Figure 2:
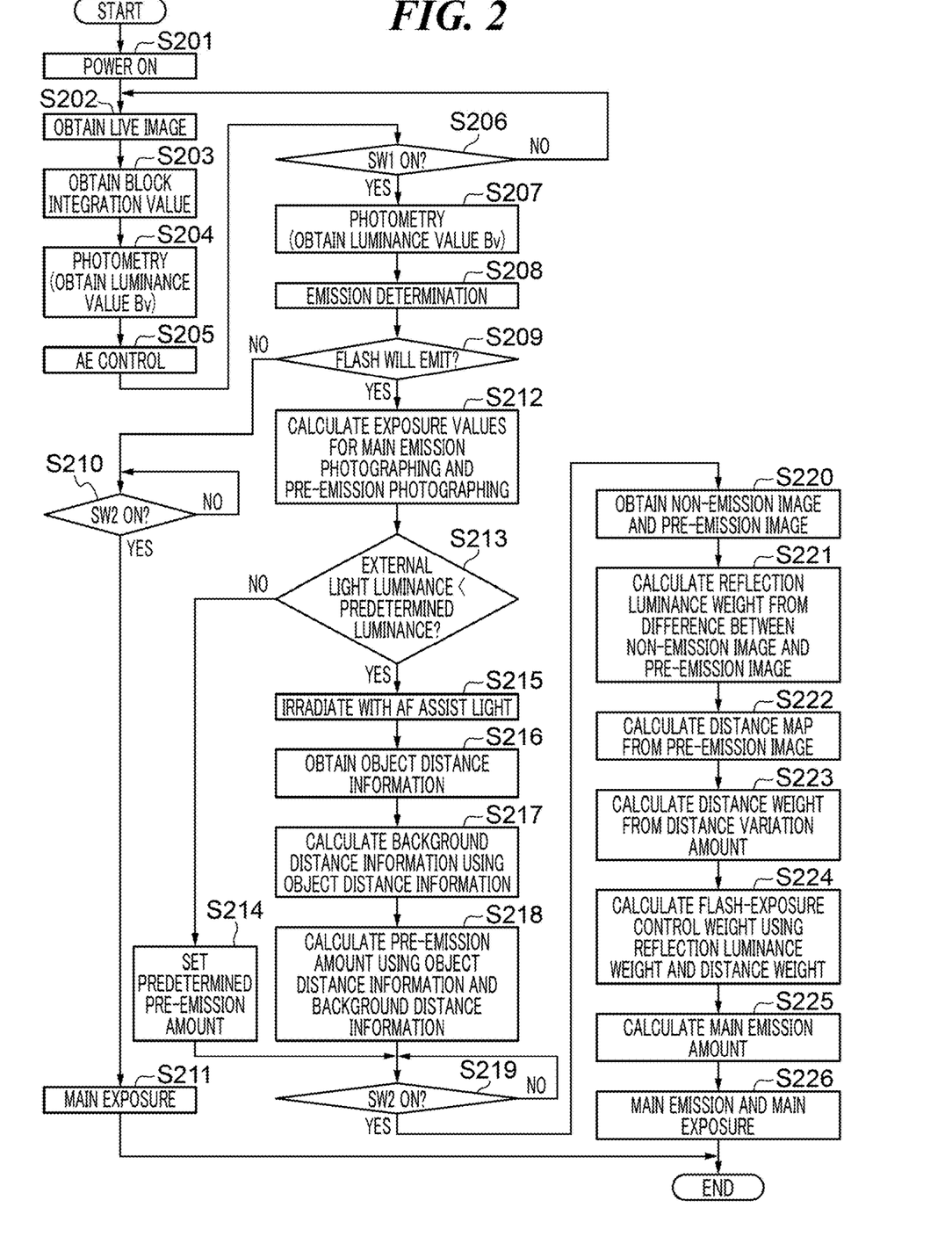
FIG. 2 is a flowchart describing weight calculation that uses a distance map.

FIG. 2 is a flowchart describing weight calculation that uses the distance map. Each process shown in FIG. 2 is executed when the CPU runs a program that is stored in the ROM of the controller 102 and is developed to the RAM.

As shown in FIG. 2, when the power source is turned ON in step S201, the controller 102 starts photographing a live image and will obtain an image signal photographed in step S202 and proceeds with the process to step S203. In the step S203 and step S204, the controller 102 calculates an object luminance (brightness) value By of an image from the read image signal and proceeds with the process to step S205. In this embodiment, an image frame is divided into a plurality of blocks and an image-frame average luminance is calculated using block integration values that are obtained by integrating luminance values in the respective blocks. When the obtained image-frame average luminance is shifted from a proper luminance, the controller 102 calculates a shift amount, sets up an exposure value to obtain the proper luminance in the step S205, and proceeds with the process to step S206.

The controller 102 determines whether the SW1 is turned ON in the step S206. The controller 102 repeats the process in the steps S202 through S205 until the SW1 is turned ON. When the SW1 is turned ON, the process proceeds to step S207. In the step S207, the controller 102 performs photometry and obtains a luminance value By. In step S208, the controller 102 performs emission determination on the basis of the obtained luminance value By and proceeds with the process to step S209. In the step S209, the controller 102 determines whether the electronic flash will emit according to the result of the emission determination in the step S208. When determining that the electronic flash will not emit, the controller proceeds with the process to step S210. When determining that the electronic flash will emit, the controller proceeds with the process to step S212.

In the step S210, the controller 102 waits until the SW2 is turned ON and calculates exposure values (aperture value Av, shutter speed Tv, and ISO speed Sv) for the non-emission photographing using the luminance value By obtained by the photometry. When the SW2 is turned ON, the controller 102 proceeds with the process to step S211, performs the main exposure with the calculated exposure values, and finishes the process.

In the meantime, the controller 102 calculates exposure values for the pre-emission photographing and exposure values for the main emission photographing using the luminance value By obtained by the photometry in the step S212, and proceeds with the process to step S213. In the step S213, the controller 102 determines whether the external light luminance is lower than a predetermined luminance value By for the AF assist light emission. When the external light luminance is lower, the controller 102 proceeds with the process to step S215. When the external light luminance is not lower, the controller 102 proceeds with the process to step S214.

Figure 3A:
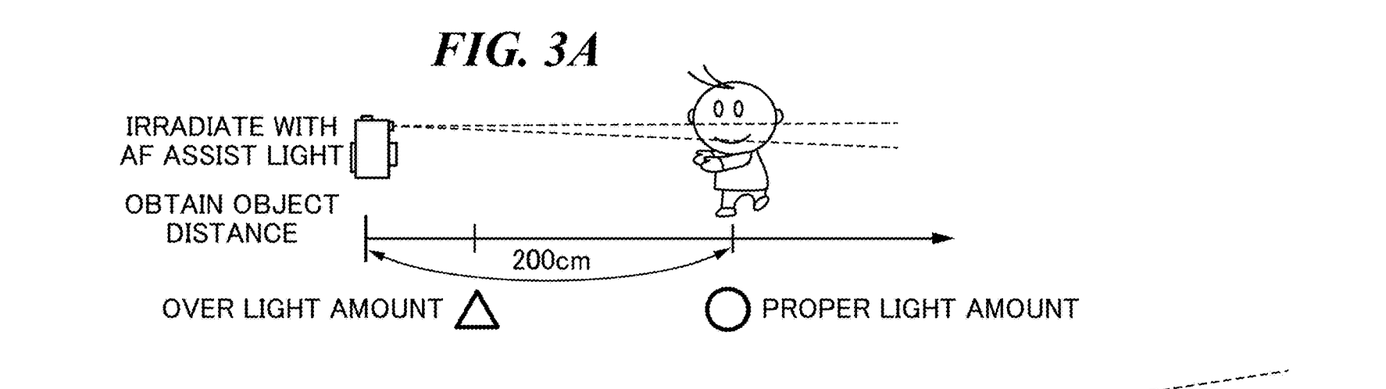
FIG. 3A and FIG. 3B are views describing an effect of variation of a pre-emission amount.

The controller 102 sets up the predetermined pre-emission amount in the step S214 without emitting the AF assist light, and proceeds with the process to step S219. In the meantime, the controller 102 causes to emit the AF assist light in the step S215 and proceeds with the process to step S216. The controller 102 obtains a distance to the object that is illuminated by the AF assist light in the step S216 as shown in FIG. 3A and proceeds with the process to step S217. When the distance cannot be measured, the object distance is presumed according to a size of a face in a case where the object is a person.

Figure 3B:
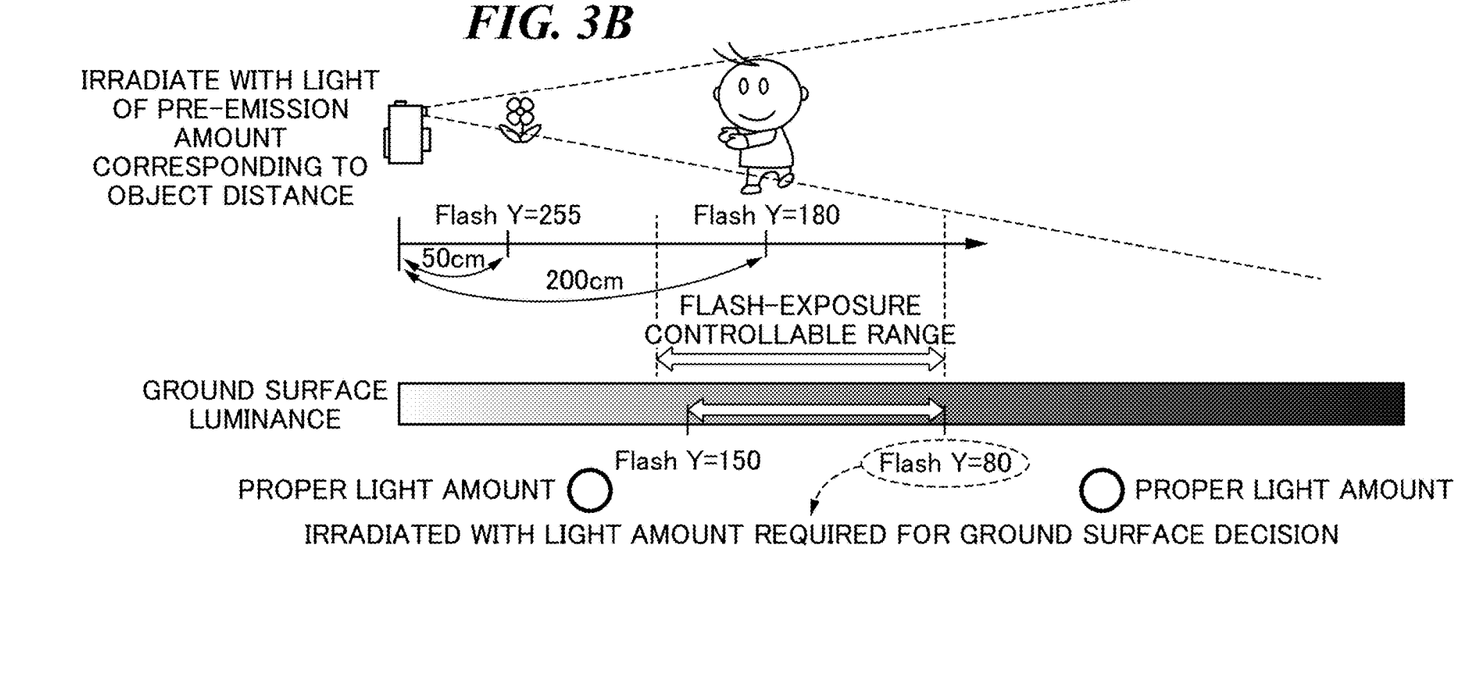

Since the AF assist light is limited in an irradiation angle, the light may not reach the background. Accordingly, the controller 102 calculates background distance information using the obtained object distance information in the step S217 and proceeds with the process to step S218. The controller 102 calculates the pre-emission amount on the basis of the obtained object distance information and background distance information so that the object will become high illuminance within a flash-exposure controllable range in the step S218 as shown in FIG. 3B and proceeds with the process to step S219.

As shown in (2) in FIG. 4B, the background luminance also becomes bright by irradiating with the light of the pre-emission amount calculated in the step S218, which improves accuracy of a distance map that will be generated later.

Figure 4A:
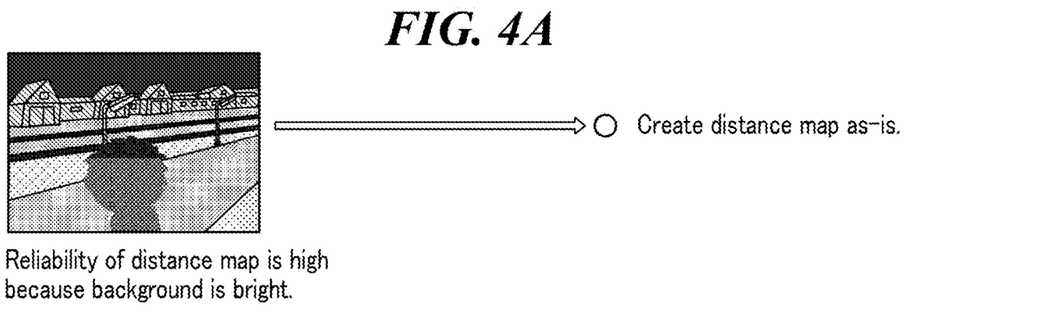
FIG. 4A and FIG. 4B are views describing light amounts corresponding to scenes in which external lights are different.
Figure 4B:
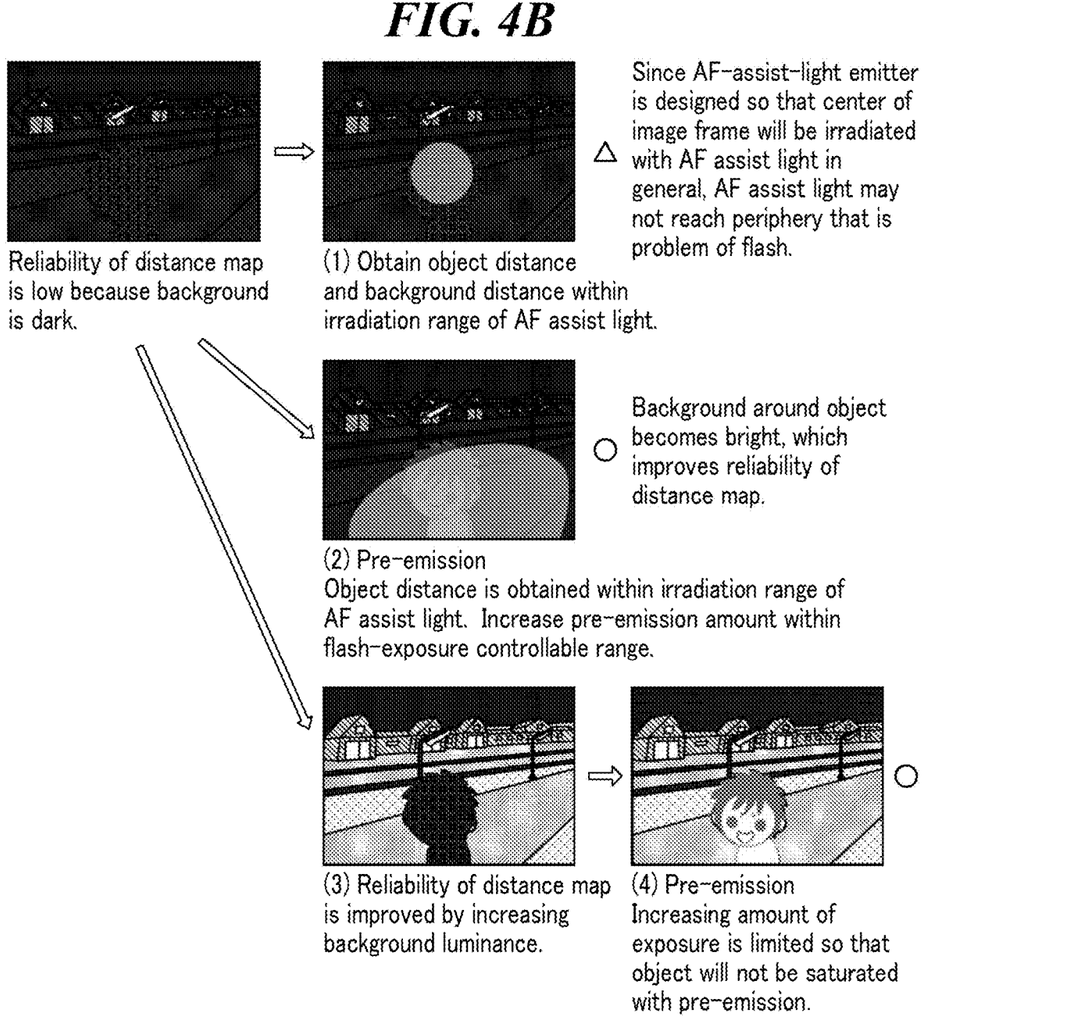
Figure 5A:
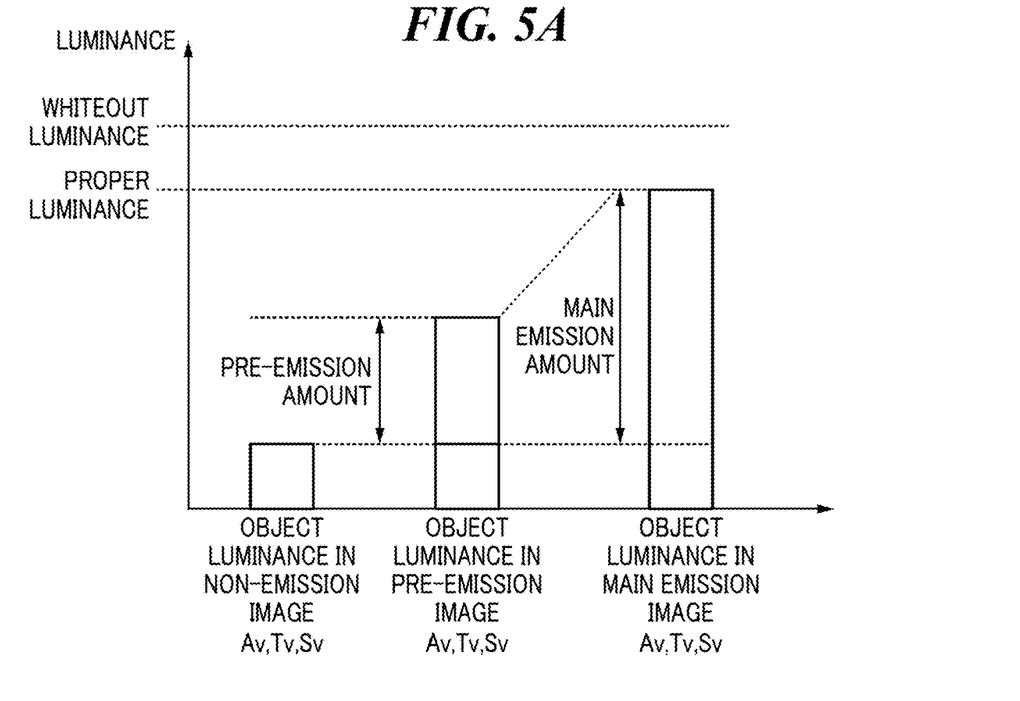
FIG. 5A and FIG. 5B are graphs describing mechanisms of the flash-exposure control in a case where an exposure at a time of pre-emission photographing is not changed and in a case where the exposure is raised.

A means for increasing the background luminance is not limited to the adjustment of the pre-emission amount, but also a method for managing the exposure of the entire image frame ((3) and (4) in FIG. 4B) may be employed. It is assumed that the exposure values for the flash-exposure control and the main exposure are Av, Tv, and Sv at the time of the emission determination. When the external light luminance is higher than the predetermined luminance, a light amount equivalent to the difference between the object luminance that is obtained by the pre-emission photographing with the predetermined pre-emission amount and the proper luminance is calculated, and the main emission amount is obtained by adding the calculated light amount to the pre-emission amount as shown in FIG. 5A.

Figure 5B:
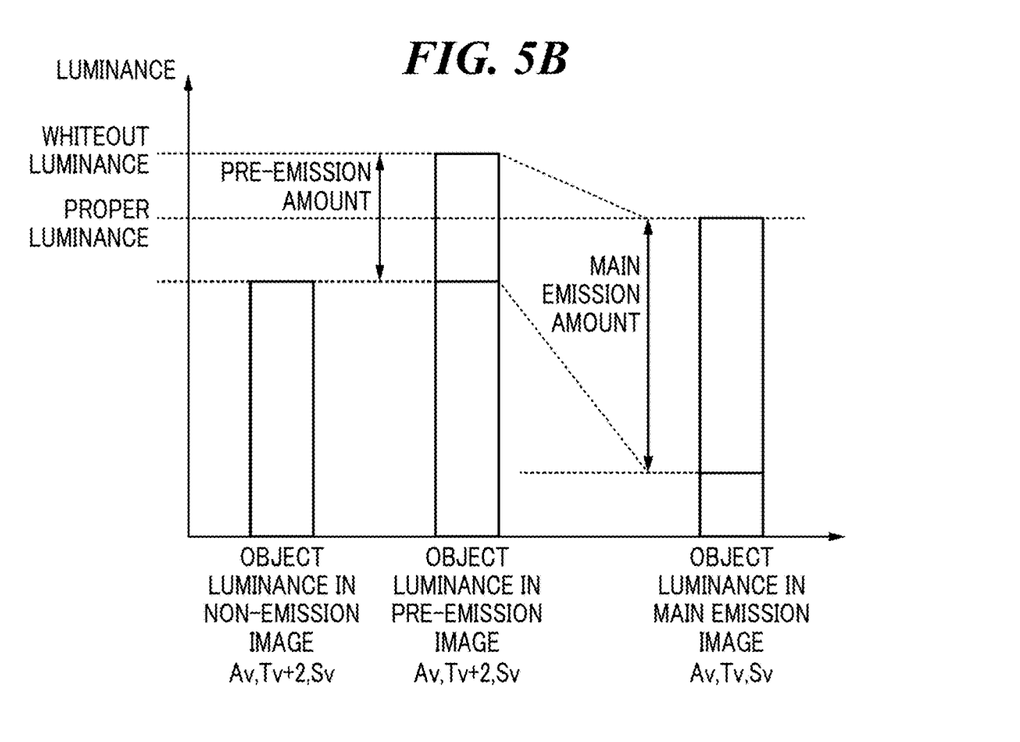

Against this, when the external light luminance is lower than the predetermined luminance, the object is irradiated with the AF assist light to obtain the object distance information first, and the background distance information is calculated on the basis of the object distance information. The exposure for the pre-emission photographing is adjusted on the basis of the obtained object distance information and background distance information and the predetermined pre-emission amount so that the level will not exceed a whiteout limit. The pre-emission photographing is performed according to the adjusted exposure, and the main emission amount is calculated using the obtained result of the pre-emission photographing. The distance map is generated using the bright pre-emission image obtained at this time. The external light luminance is raised by increasing at least one of the exposure values for the flash-exposure control calculated at the time of the "SW1 ON". Two steps are added to Tv in the example in FIG. 5B.

Figure 6A:
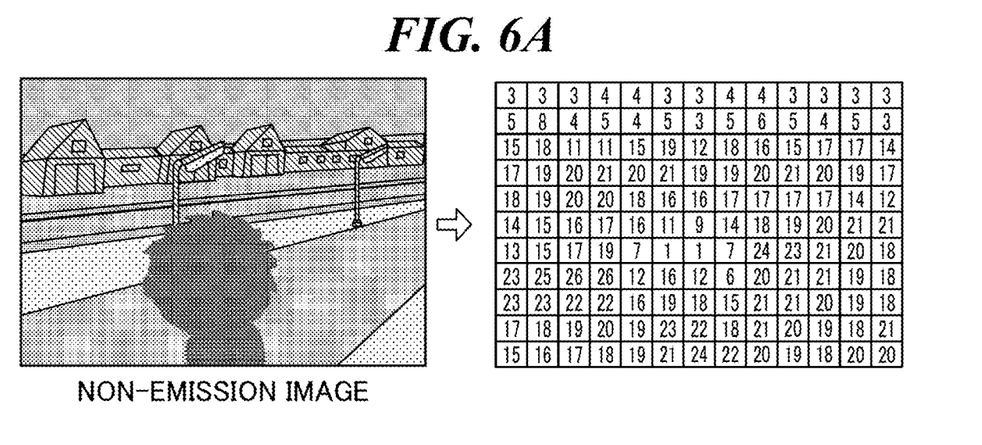
FIG. 6A through FIG. 6C are views describing generation of reflection luminance weights by the pre-emission photographing.
Figure 6B:
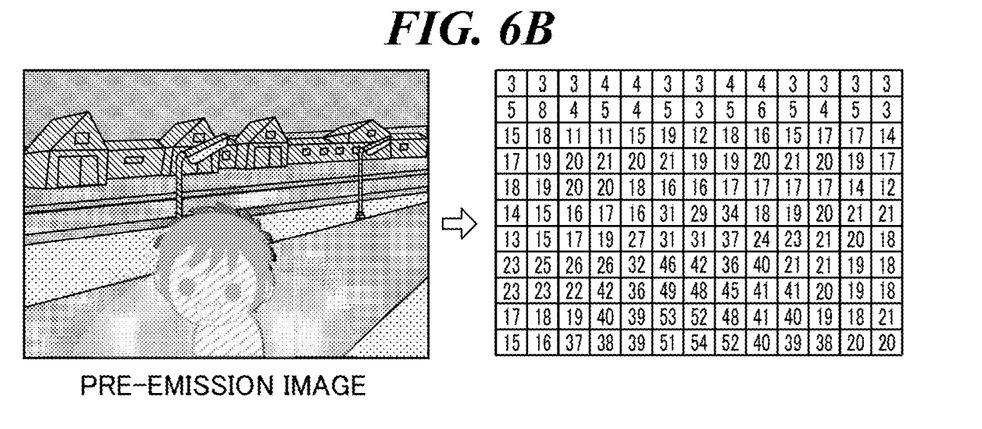
Figure 6C:
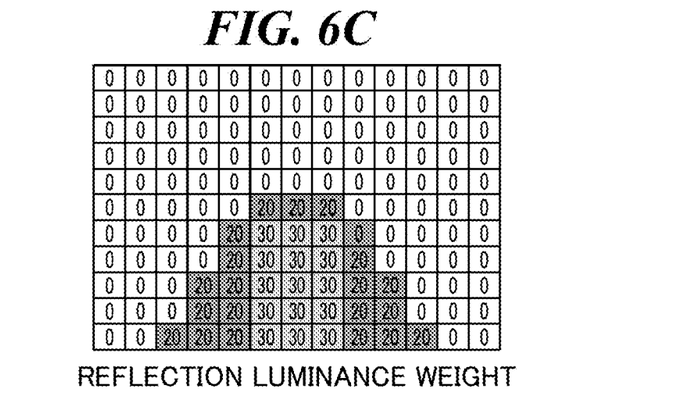

The controller 102 waits until the SW2 is turned ON in the step S219, and proceeds with the process to step S220 when the SW2 is turned ON. The controller 102 obtains the non-emission image and pre-emission image for the flash-exposure control in order to calculate a required main emission amount in the step S220, and proceeds with the process to step S221. In the step S221, the controller 102 divides each of the non-emission image (FIG. 6A) obtained in the step S220 and the pre-emission image (FIG. 6B) into a plurality of blocks, finds a block luminance value by integrating the luminance values of the pixels in each block, and calculates the reflection luminance weight (FIG. 6C) in an object region extracted on the basis of the difference (or ratio) between the corresponding block luminance values. And then, the controller 102 proceeds with the process to step S222. The object weight (flash-exposure control weight) used by the flash-exposure control calculation is generated by extracting a value in the object region found from among default weights distributed by a centrally weighted manner.

Figure 7A:
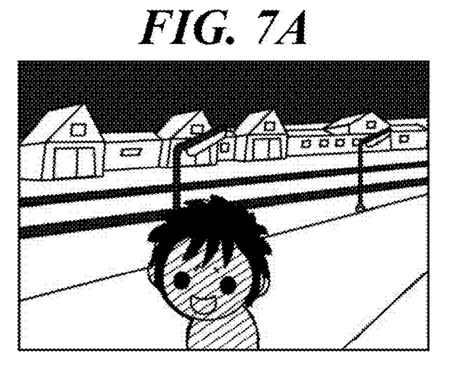
FIG. 7A through FIG. 7F are views describing generation of distance weights using intra-frame distance difference.

In the step S222, the controller 102 generates a distance map (FIG. 7B) using the pre-emission image (picked-up image frame, FIG. 7A) for the flash-exposure control obtained in the step S220, and proceeds with the process to step S223.

This embodiment assumes that the distance map is obtained using image-pickup-plane phase difference pixels. The image-pickup-plane phase difference pixels for measuring a distance are inserted in the image pickup device, and the distance map is obtained by obtaining a focus detection result for every pixel at the same time as the video signal is obtained.

Figure 7B:
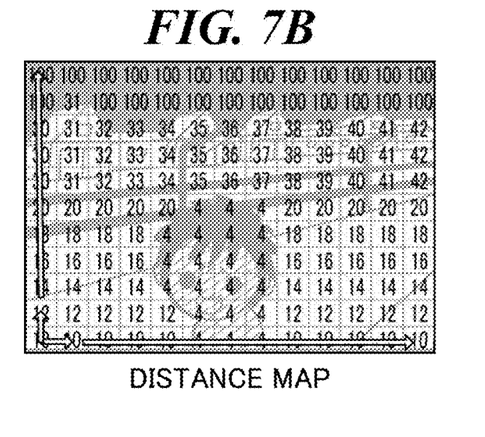

In the step S223, the controller 102 calculates a distance weight (FIG. 7E) from the distance variation amount in the distance map and proceeds with the process to step S224. FIG. 7B is a view showing an example in which the distance information of the distance map obtained by an obtaining operation of the distance map is described in each block by the metric unit. These blocks are searched for the distance difference between each of adjacent blocks. Although the starting point of the difference search is the lower-left block, the starting point may be the nearest block among the peripheral blocks.

Figure 7C:
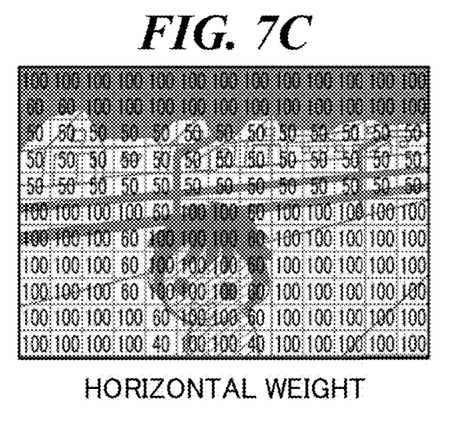
Figure 7D:
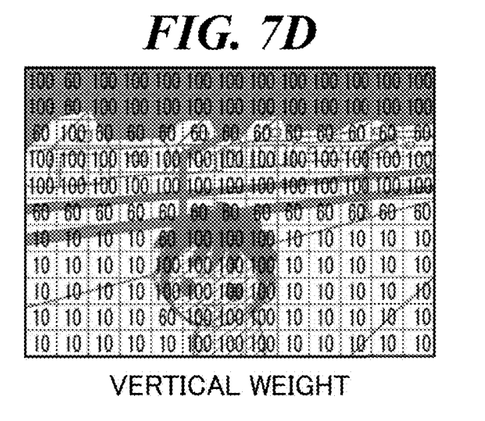
Figure 7E:
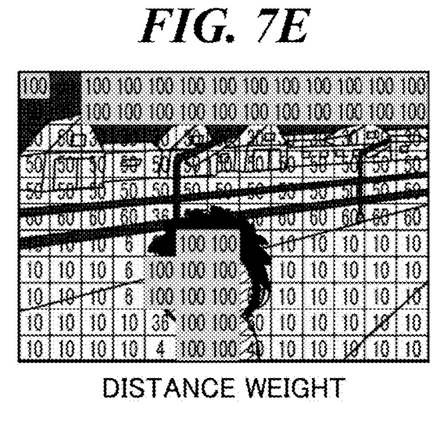
Figure 7F:
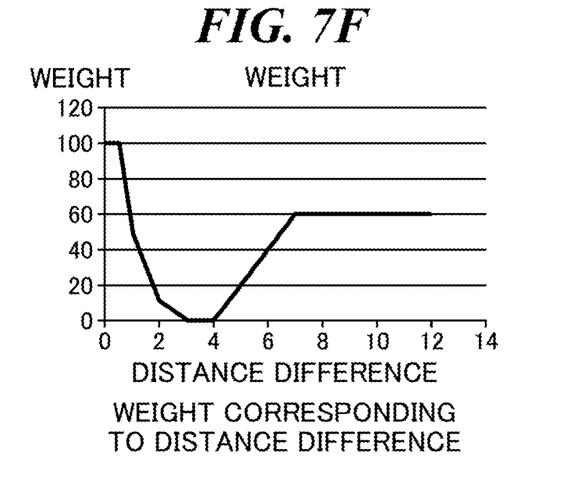

First, as shown in FIG. 7B, a distance difference between a block and a right adjacent block (horizontal difference) is sequentially checked in the same direction from the lower-left block as the starting point, a weight corresponding to the distance difference is set according to a graph in FIG. 7F. A first region where the distance difference is small (smaller than a predetermined amount) is considered as the same object, and the object weight is set higher in the first region. Moreover, a second region where the gentle distance difference within a predetermined range continues is considered as a ground surface, and the object weight is decreased in the second region. A region where the distance difference is more than the predetermined amount is considered as a boundary between an object and a background, the object weight is decreased in such a region. This difference search is performed for all the blocks from the lower left to the upper portion of the image frame, and horizontal weights shown in FIG. 7C are obtained.

Next, as shown in FIG. 7B, the distance difference between a block and an upper adjacent block (vertical difference) is sequentially checked from the lower-left block as the starting point, a weight corresponding to the distance difference is set according to the graph in FIG. 7F. In this place, a weight is set in the same manner as the horizontal difference, and vertical weights shown in FIG. 7D are obtained. Next, distance weights shown in FIG. 7E are obtained by multiplying the horizontal weights in FIG. 7C by the vertical weights in FIG. 7D.

Figure 8A:
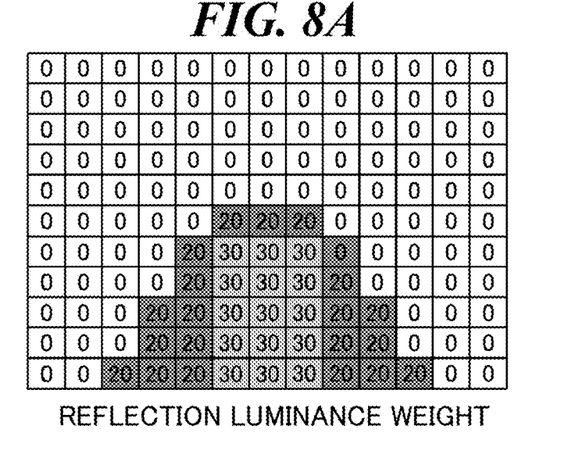
FIG. 8A through FIG. 8C are views describing generation of flash-exposure control weights from the reflection luminance weights and the distance weights.
Figure 8B:
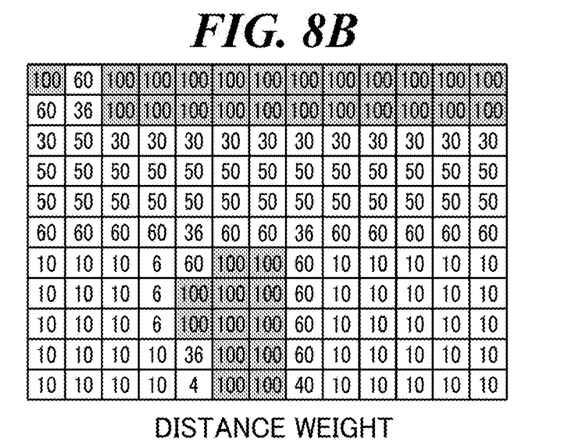
Figure 8C:
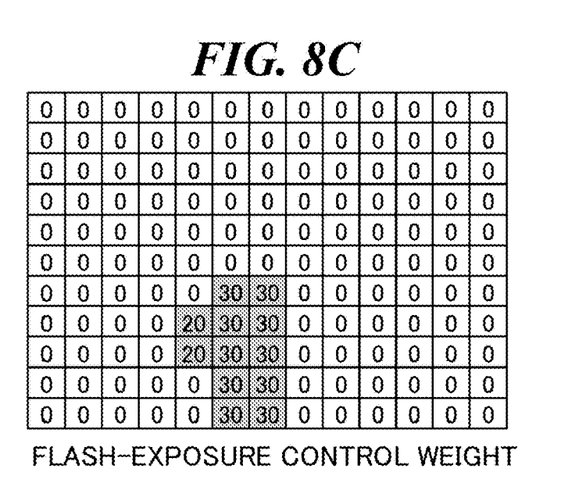

In the step S224, the controller 102 calculates the object weights (flash-exposure control weights) that the background is removed by extracting the reflection luminance weights (FIG. 8A) obtained by the pre-emission photographing in blocks of which the distance weights are "100" (FIG. 7E, FIG. 8B). And then, the controller 102 proceeds with the process to step S225.

In the step S225, the controller 102 performs the flash-exposure control calculation so that the image-frame average luminance that is weighted by the object weight will approach the proper luminance as the target. In the description, it is assumed that the object is illuminated by external light even at the time of the non-emission photographing. Accordingly, the luminance difference between the pre-emission image and non-emission image is extracted and is used as an emission amount at the time of the pre-emission photographing. Moreover, an emission amount required to fill the difference between the proper luminance and the object luminance in the non-emission image is calculated as the main emission amount. And then, the process proceeds to step S226. In the step S226, the controller 102 performs the main emission and main exposure, and finishes the process.

As mentioned above, the embodiment enables to divide an object from a background suitably even in a case of photographing in a dark place that needs flash emission, which produces a good emission image.

It should be noted that the present invention is not limited to what is exemplified in the above-mentioned embodiment and can be modified suitably as long as it does not deviate from the gist of the present invention.

For example, although the above-mentioned embodiment describes the method for obtaining the distance map using the image-pickup-plane phase difference pixels, the present invention is not limited to this. The method may use an AF signal obtained by contrast AF or an external sensor. Moreover, the distance map may be obtained at any of the timing of the photometry of the external light and the timing of the flash-exposure control of the pre-emission photographing. A distance map that has been obtained beforehand may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-098053, filed May 22, 2018, which is hereby incorporated by reference herein in its entirety.

What is claimed is:

1. An image pickup apparatus comprising:
an image sensor that outputs an image signal;
a memory device that stores instructions; and
at least one processor that executes the instructions to:
calculate a main emission amount using a luminance of a pre-emission image corresponding to the image signal;
divide a picked-up image frame corresponding to the image signal into a plurality of blocks;
obtain distance information for each of the plurality of blocks;
adjust a luminance of the image signal for each of the plurality of blocks;
determine whether a distance continuously varies in a same direction between adjacent blocks within a region corresponding to a same object based on the distance information, which is obtained using the image signal of which the luminance has been adjusted;
generate a reflection luminance weight by employing one of a difference and a ratio between an image under external light luminance and an image under luminance at a time of pre-emission photographing; and
calculate an object weight for flash-exposure control using information about a distance weight that is obtained by the determination and information about the reflection luminance weight.

2. The image pickup apparatus according to claim 1, wherein the at least one processor executes instructions in the memory device to obtain the distance information using an adjusted pre-emission image.

3. The image pickup apparatus according to claim 1, wherein the at least one processor executes instructions in the memory device to adjust a pre-emission amount for flash-exposure control.

4. The image pickup apparatus according to claim 3, wherein the at least one processor executes instructions in the memory device to adjust the pre-emission amount so that the luminance of the object at a time of pre-emission photographing will become high within a flash-exposure controllable range.

5. The image pickup apparatus according to claim 1, wherein the at least one processor executes instructions in the memory device to adjust the external light luminance in exposure setting for flash-exposure control.

6. The image pickup apparatus according to claim 5, wherein the memory device stores a predetermined pre-emission amount beforehand.

7. The image pickup apparatus according to claim 1, wherein the at least one processor executes instructions in the memory device to determine that the distance between the adjacent blocks continuously varies in a case where a variation amount of the distance between the adjacent blocks falls within a predetermined range.

8. The image pickup apparatus according to claim 1, wherein the at least one processor executes instructions in the memory device to determine that the adjacent blocks show a same object in a case where a variation amount of the distance between the adjacent blocks is less than a predetermined amount.

9. The image pickup apparatus according to claim 1, wherein the at least one processor executes instructions in the memory device to:
divide the plurality of blocks into a first region where the distance is constant and a second region where the distance varies; and
decrease a weight in the second region in contrast with a weight in the first region.

10. The image pickup apparatus according to claim 1, wherein the at least one processor executes instructions in the memory device to irradiate an object with AF assist light.

11. The image pickup apparatus according to claim 1, wherein the at least one processor executes instructions in the memory device to presume distance of an object according to a face size of a person as the object in a case where the distance of the object cannot be obtained.

12. The image pickup apparatus according to claim 1, wherein the at least one processor executes instructions in the memory device to determine whether the distance continuously varies in the same direction between adjacent blocks within the region corresponding to the same object based on the distance information, which is obtained using the image signal of which the luminance has not been adjusted in a case where the external light luminance is determined to be not less than a predetermined luminance.

13. A control method for an image pickup apparatus comprising an image sensor that outputs an image signal, a memory device that stores instructions, and at least one processor that executes the instructions to implement the control method, the control method comprising:
calculating a main emission amount using a luminance of a pre-emission image corresponding to the image signal;
dividing a picked-up image frame corresponding to the image signal into a plurality of blocks;
obtaining distance information for each of the plurality of blocks;
adjusting a luminance of the image signal for each of the plurality of blocks;
determining whether a distance continuously varies in a same direction between adjacent blocks within a region corresponding to a same object based on the distance information, which is obtained using the image signal of which the luminance has been adjusted;

generating a reflection luminance weight by employing one of a difference and a ratio between an image under external light luminance and an image under luminance at a time of pre-emission photographing; and calculating an object weight for flash-exposure control using information about a distance weight that is obtained by the determination and information about the reflection luminance weight.

\* \* \* \* \*